US008509088B2

(12) United States Patent
Kondo (10) Patent No.: US 8,509,088 B2
(45) Date of Patent: Aug. 13, 2013

(54) COMMUNICATION APPARATUS AND COMMUNICATION METHOD

(75) Inventor: Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 173 days.

(21) Appl. No.: 12/882,140

(22) Filed: Sep. 14, 2010

(65) Prior Publication Data

US 2011/0063980 A1 Mar. 17, 2011

(30) Foreign Application Priority Data

Sep. 16, 2009 (JP) ................................. 2009-213964

(51) Int. Cl.
*H04L 12/28* (2006.01)
(52) U.S. Cl.
USPC .......................................... 370/238; 455/445
(58) Field of Classification Search
None
See application file for complete search history.

(56) References Cited

U.S. PATENT DOCUMENTS

| 7,907,919 | B2 | 3/2011 | daCosta | |
|---|---|---|---|---|
| 2005/0152289 | A1* | 7/2005 | Nagata et al. | 370/256 |
| 2008/0037560 | A1 | 2/2008 | Jia et al. | |
| 2008/0240078 | A1* | 10/2008 | Thubert et al. | 370/351 |
| 2009/0034419 | A1* | 2/2009 | Flammer et al. | 370/238 |

FOREIGN PATENT DOCUMENTS

| JP | 2003-069620 | | 3/2003 |
|---|---|---|---|
| JP | 2005-347850 | A | 12/2005 |
| JP | 2006-101428 | A | 4/2006 |
| JP | 2006-211375 | A | 8/2006 |
| JP | 2007-506337 | A | 3/2007 |
| JP | 2008-199504 | | 8/2008 |
| JP | 2009-527986 | | 7/2009 |

OTHER PUBLICATIONS

"Japanese Office Action" mailed by JPO and corresponding to Japanese application No. 2009-213964 on Apr. 23, 2013, with English translation.

* cited by examiner

*Primary Examiner* — Chi Pham
*Assistant Examiner* — Mohammad Adhami
(74) *Attorney, Agent, or Firm* — Fujitsu Patent Center

(57) ABSTRACT

A communication apparatus includes an acquiring unit that acquires wireless cost for each path to other communication apparatuses in an ad hoc network to which the communication apparatus belongs; an accumulating unit that accumulates wireless cost for each path, acquired at different times by the acquiring unit; a determining unit that determines a priority level for each path, based on time correlations among the paths in terms of the wireless cost accumulated by the accumulating unit; and a communicating unit that communicates with the other communication apparatuses by preferentially using a path of a relatively high priority level.

5 Claims, 7 Drawing Sheets

LIST A

| No. | DESTINATION | WIRELESS COST |
|-----|-------------|---------------|
| 1 | E | $COST(rE1, tn) = \sum_{j=1}^{N(rE1)} \cos t(rE1, hj, tn)$ |
| 2 | E | $COST(rE2, tn) = \sum_{j=1}^{N(rE2)} \cos t(rE2, hj, tn)$ |
| 3 | E | $COST(rE3, tn) = \sum_{j=1}^{N(rE3)} \cos t(rE3, hj, tn)$ |
| 4 | D | $COST(rD1, tn) = \sum_{j=1}^{N(rD1)} \cos t(rD1, hj, tn)$ |
| ⋮ | ⋮ | ⋮ |

| No. | DESTI-NATION | WIRELESS COST |
|---|---|---|
| 1 | E | COST(rE1,t1) = 1 |
| 2 | E | COST(rE2,t1) = 2 |
| 3 | E | COST(rE3,t1) = 3 |
| 4 | E | COST(rE4,t1) = 4 |
| ... | ... | ... |

611

| No. | DESTI-NATION | WIRELESS COST |
|---|---|---|
| 1 | E | COST(rE1,t2) = 0 |
| 2 | E | COST(rE2,t2) = 0 |
| 3 | E | COST(rE3,t2) = 0 |
| 4 | E | COST(rE4,t2) = 0 |
| ... | ... | ... |

612

| No. | DESTI-NATION | WIRELESS COST |
|---|---|---|
| 1 | E | COST(rE1,t3) = 1 |
| 2 | E | COST(rE2,t3) = 2 |
| 3 | E | COST(rE3,t3) = 0 |
| 4 | E | COST(rE4,t3) = 0 |
| ... | ... | ... |

613

| No. | DESTI-NATION | WIRELESS COST |
|---|---|---|
| 1 | E | COST(rE1,t4) = 0 |
| 2 | E | COST(rE2,t4) = 0 |
| 3 | E | COST(rE3,t4) = 3 |
| 4 | E | COST(rE4,t4) = 4 |
| ... | ... | ... |

614

| No. | DESTI-NATION | WIRELESS COST |
|---|---|---|
| 1 | E | COST(rE1,t5) = 0 |
| 2 | E | COST(rE2,t5) = 0 |
| 3 | E | COST(rE3,t5) = 3 |
| 4 | E | COST(rE4,t5) = 0 |
| ... | ... | ... |

615

| No. | DESTI-NATION | WIRELESS COST |
|---|---|---|
| 1 | E | COST(rE1,t6) = 1 |
| 2 | E | COST(rE2,t6) = 2 |
| 3 | E | COST(rE3,t6) = 0 |
| 4 | E | COST(rE4,t6) = 4 |
| ... | ... | ... |

COMMUNICATION APPARATUS AND COMMUNICATION METHOD

CROSS-REFERENCE TO RELATED APPLICATIONS

This application is based upon and claims the benefit of priority from the prior Japanese Patent Application No. 2009-213964, filed on Sep. 16, 2009, the entire contents of which are incorporated herein by reference.

FIELD

The embodiments discussed herein are related to a communication apparatus and a communication method.

BACKGROUND

An ad hoc network is under investigation that is configured by terminals wirelessly connectable to each other and that can execute communication without a wireless Local Area Network (LAN) access point, etc.

For example, a wireless communication system has been disclosed that transmits and receives packets between a transmission source terminal and a destination terminal through at least one relay terminal in an ad hoc network including plural terminals, where the transmission source terminal broadcasts a path request packet to the destination terminal; the relay terminal additionally writes the available band and the address of the relay terminal in the path request packet, and subsequently broadcasts the path request packet; the destination terminal selects a path to communicate packets to/from the transmission source terminal based on the available band additionally written in the path request packet, and notifies the transmission source terminal of the path selected; and the transmission source terminal sets the path reported by the destination terminal as a path to transmit and receive packets to/from the destination terminal (see, e.g., Japanese Laid-Open Patent Publication No. 2005-347850).

A technique has also been disclosed, where a first communication path from a wireless terminal "A" through a wireless terminal "C" to a wireless terminal "E" and a second communication path from the wireless terminal A through the wireless terminal C to a wireless terminal "G" are formed. In this state, when a communication path is constructed between the wireless terminal A and a wireless terminal "H", and a wireless terminal "D" receives a path request message from the wireless terminal C having a high load, before receiving a path request message from a wireless terminal "F" having a low load, the path request message from the wireless terminal F having a low load is selected. Consequently, rather than the path with the least number of hops from the wireless terminal A through the wireless terminal C and the wireless terminal D to the wireless terminal H, a communication path that has one more hop, excludes the wireless terminal C whose processing load is high, and is from the wireless terminal A through the wireless terminal B, the wireless terminal F and the wireless terminal D to the wireless terminal H is established (see, e.g., Japanese Laid-Open Patent Publication No. 2006-211375).

However, with the above conventional techniques, in the ad hoc networks, the state of the networks vary continuously due to fading, etc., and therefore, a problem arises in that stable communication cannot be executed. When path searches are frequently executed to enable an optimal path to be selected according to the varying state of the network, another problem arises in that the wireless resources are pressured.

SUMMARY

According to an aspect of an embodiment, a communication apparatus includes an acquiring unit that acquires wireless cost for each path to other communication apparatuses in an ad hoc network to which the communication apparatus belongs; an accumulating unit that accumulates wireless cost for each path, acquired at different times by the acquiring unit; a determining unit that determines a priority level for each path, based on time correlations among the paths in terms of the wireless cost accumulated by the accumulating unit; and a communicating unit that communicates with the other communication apparatuses by preferentially using a path of a relatively high priority level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
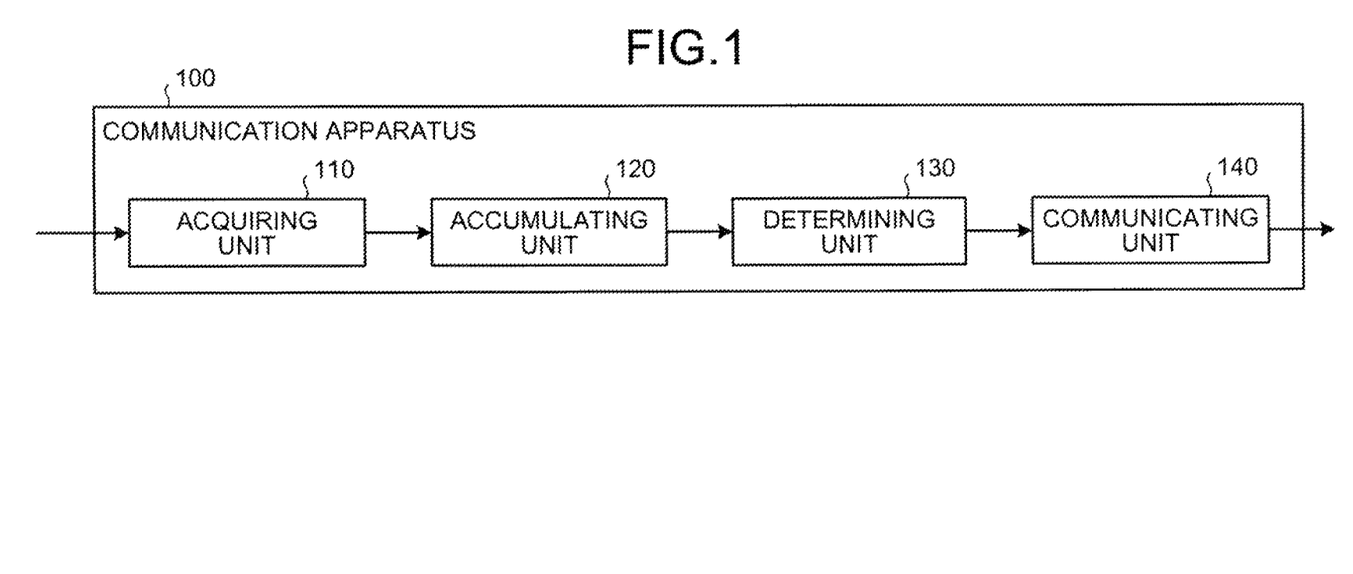
FIG. 1 is a block diagram of a configuration of a communication apparatus according to an embodiment.

FIG. 1 is a block diagram of a configuration of a communication apparatus according to an embodiment. A communication apparatus 100 according to the embodiment depicted in FIG. 1 is a communication apparatus that belongs to an ad hoc network and communicates with other communication apparatuses in the ad hoc network. The communication apparatus 100 is, for example, a mobile terminal such as a cellular telephone. The communication apparatus 100 includes an acquiring unit 110, an accumulating unit 120, a determining unit 130, and a communicating unit 140.

The acquiring unit 110 acquires wireless cost for a path to other communication apparatuses of the ad hoc network to which the communication apparatus 100 belongs. Wireless cost is transmission cost such as line quality, packet wait time, the amount of traffic, and battery consumption at each node. Wireless cost is calculated for each span of each node.

The acquiring unit acquires the wireless cost of each path at different times of the day (times of the year). For example, the acquiring unit 110 regularly acquires the wireless cost of each path by executing path searches of the ad hoc network at constant intervals. The path search is executed by, for example, causing a path search packet to make a round trip in the ad hoc network. The acquiring unit 110 outputs to the accumulating unit 120, a path cost list that indicates the acquired wireless cost of each path.

The accumulating unit 120 accumulates the path cost list output from the acquiring unit 110. The accumulating unit 120 further accumulates path cost lists output in the past from the acquiring unit 110. Therefore, the accumulating unit 120 accumulates path cost lists acquired at different times by the acquiring unit 110.

The determining unit 130 reads the path cost lists that are accumulated by the accumulating unit 120 and that indicate wireless cost according to path, and calculates time correlations among the paths in terms of wireless cost. The determining unit 130 determines a priority level for each path to other communication apparatuses, based on the calculated time correlations among the paths. The determining unit 130 outputs to the communicating unit 140, a path priority list that indicates the determined priority level for each path.

The communicating unit 140 preferentially uses paths having higher priority levels in the path priority list output from the determining unit 130, to communicate with the other communication apparatuses. For example, the communicating unit 140 communicates using a first-priority (highest-priority) path and if a communication error occurs, switches to a second-priority path. Thereby, the time correlation of the wireless cost is reduced before and after the switching of the path, increasing the possibility of reducing the wireless cost by a switching of paths.

The communicating unit 140 may execute communication by simultaneously using paths respectively having priority levels that are equal to or higher than predetermined priority level (for example, the first-priority and the second-priority paths). Thereby, the wireless cost in terms of the time correlation is reduced between the paths used simultaneously, reducing the possibility of deterioration of the wireless costs of the paths used simultaneously even when the state of the network varies.

The acquiring unit 110 and the communicating unit 140 may be implemented by, for example, a wireless communication interface. The accumulating unit 120 may be implemented by, for example, a memory of the communication apparatus 100. The determining unit 130 may be implemented by, for example, a processing unit such as a digital signal processor (DSP).

The determining unit 130 stores the path priority list to, for example, the memory of the communication apparatus 100. The communicating unit 140 reads the path priority list stored to the memory of the communication apparatus 100 by the determining unit 130, and communicates with the other communication apparatuses, based on the path priority list read.

Figure 2:
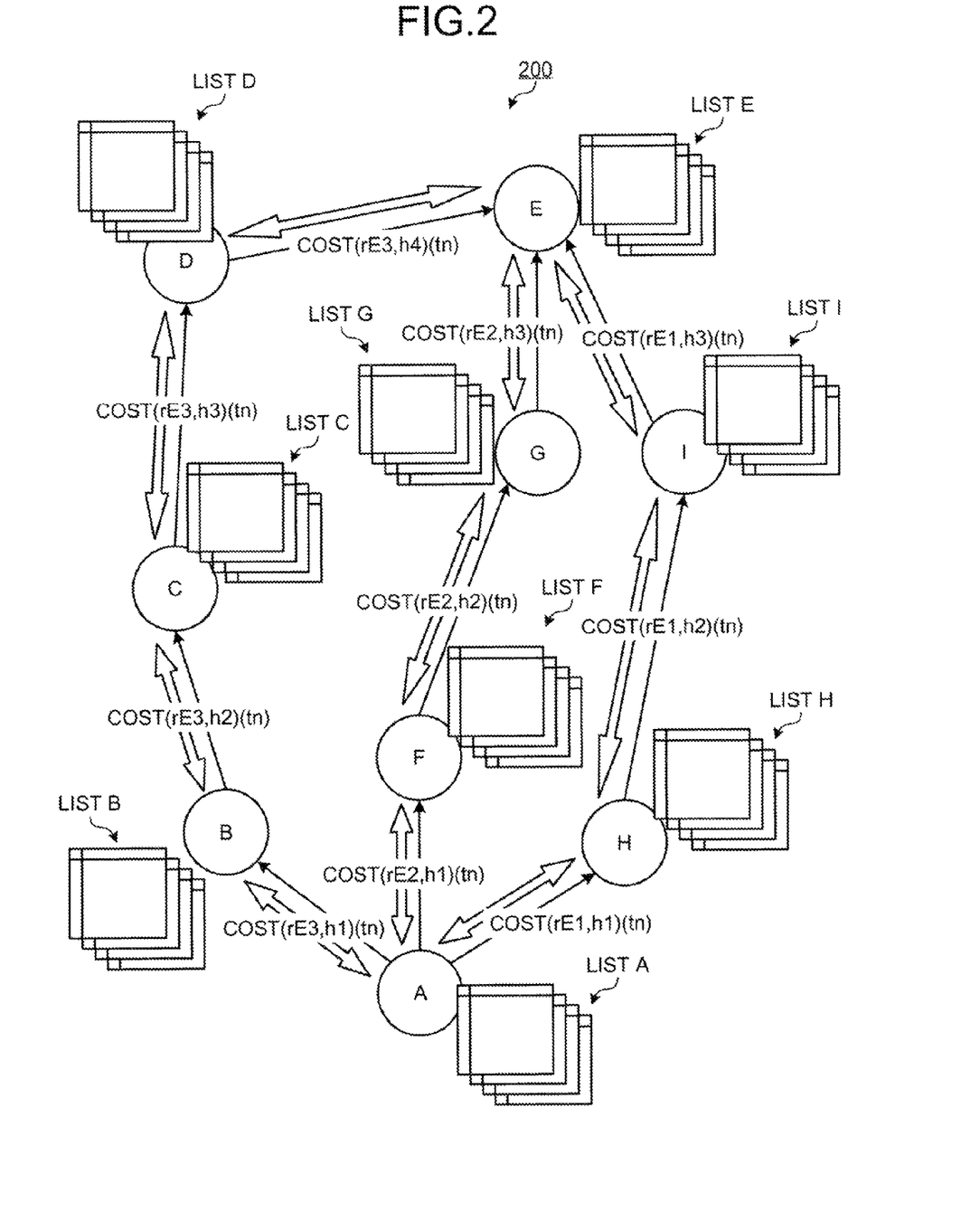
FIG. 2 is a diagram of an example of a path search by the communication apparatus depicted in FIG. 1.

FIG. 2 is a diagram of an example of a path search by the communication apparatus depicted in FIG. 1. A communication system 200 depicted in FIG. 2 is a mobile ad hoc network that is configured by nodes "A" to "I". Each of the nodes A to I is a mobile terminal that is capable of executing mobile communication.

The nodes A to I respectively have path cost list groups ListA to ListI. The path cost list groups ListA to ListI each include plural path cost lists acquired at the different times. Each of the path cost lists indicates the wireless cost of paths from a given node to another node.

In the embodiment, the communication apparatus 100 is applied to the node A and an example where the node A executes data communication with the node E will be described. The accumulating unit 120 of the communication apparatus 100 has accumulated therein the path cost list group ListA. In the communication system 200, a path rE1 that passes through the nodes H and I, a path rE2 that passes through the nodes F and G, and a path rE3 that passes through the nodes B, C, and D are paths rEi (i=1, 2, . . . ) from the node A to the node E.

"COST(R, H, tn)" represents wireless cost acquired at time "tn" for a path R (R=rE1, rE2, rE3) with a hop count H (H=h1, h2, . . . ). The time tn is an index that corresponds to a discrete time and, for example, increases each time the acquiring unit 110 acquires the wireless cost for each path.

For example, "COST(rE1, h1, tn)" represents the wireless cost acquired at the time tn for a path rE1 with a hop count h1 (from the node A to the node H). "COST(rE1, h2, tn)" represents the wireless cost acquired at the time tn for a path rE1 with a hop count h2 (from the node H to the node I). "COST (rE1, h3, tn)" represents the wireless cost acquired at the time tn for a path rE1 with a hop count h3 (from the node I to the node E).

Therefore, the wireless cost of the path rE1 is COST(rE1, h1, tn)+COST(rE1, h2, tn)+COST(rE1, h3, tn). Similarly, the wireless cost of the path rE2 is COST(rE2, h1, tn)+COST (rE2, h2, tn)+COST(rE2, h3, tn). The wireless cost of the path rE3 is COST(rE3, h1, tn)+COST(rE3, h2, tn)+COST(rE3, h3, tn)+COST(rE3, h4, tn).

Figure 3:
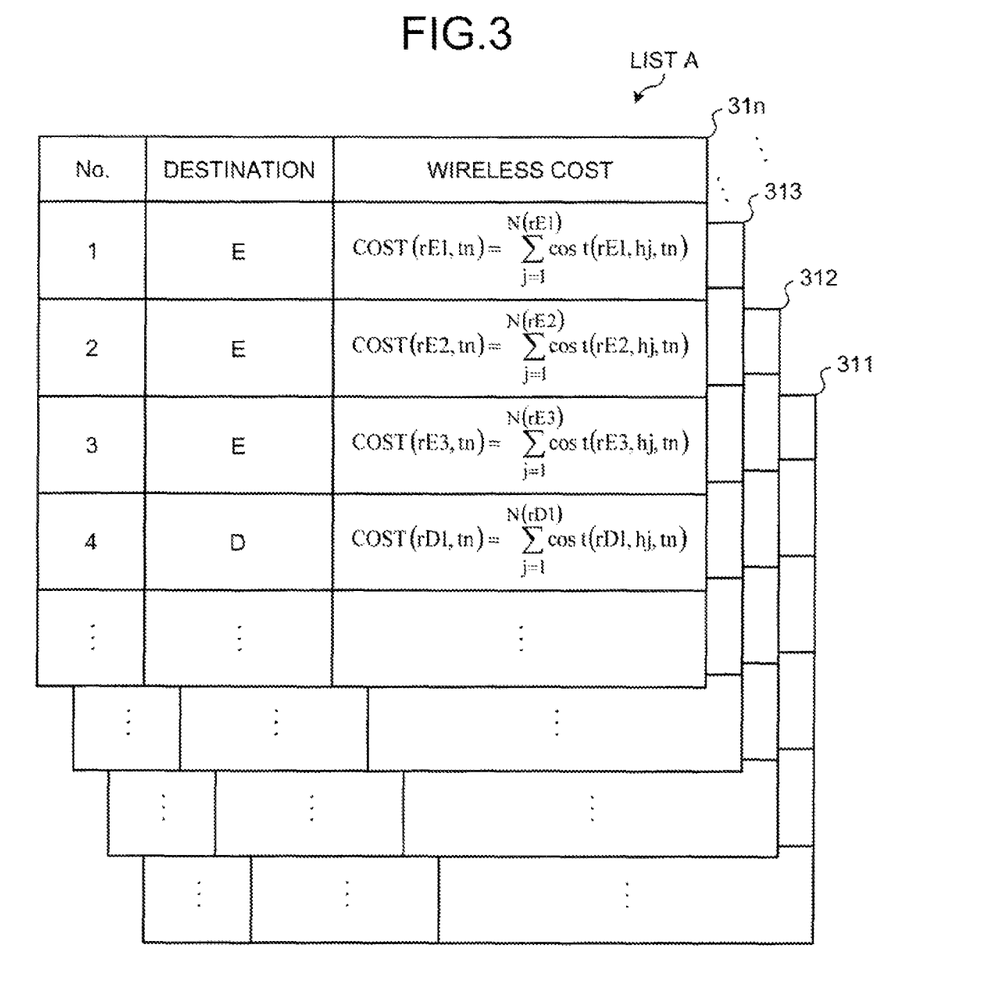
FIG. 3 is a diagram of an example of path cost lists accumulated in an accumulating unit.

FIG. 3 is a diagram of an example of the path cost lists accumulated in the accumulating unit. As depicted in FIG. 3, the path cost list group ListA accumulated in the accumulating unit 120 includes path cost lists 311 to 31n respectively acquired at times t1 to tn by the acquiring unit 110. For example, Nos. 1 to 3 of the path cost list 31n represents the wireless cost for each path to the node E, respectively.

More specifically, No. 1 of the path cost list 31n represents a wireless cost COST(rE1, tn) of the path rE1. No. 2 of the path cost list 31n represents a wireless cost COST(rE2, tn) of the path rE2. No. 3 of the path cost list 31n represents a wireless cost COST(rE3, tn) of the path rE3. "N(rE1)" to "N(rE3)" represent the total hop counts for the paths rE1 to rE3, respectively.

The path cost list 31n may further include wireless cost for paths to nodes other than the node E such as paths to the node D, as indicated by No. 4 and subsequent entries in the path cost list 31n. Similar to the path cost list 31n, the path cost lists 311 to 313 indicate the wireless cost for paths from the node A to other nodes.

Figure 4:
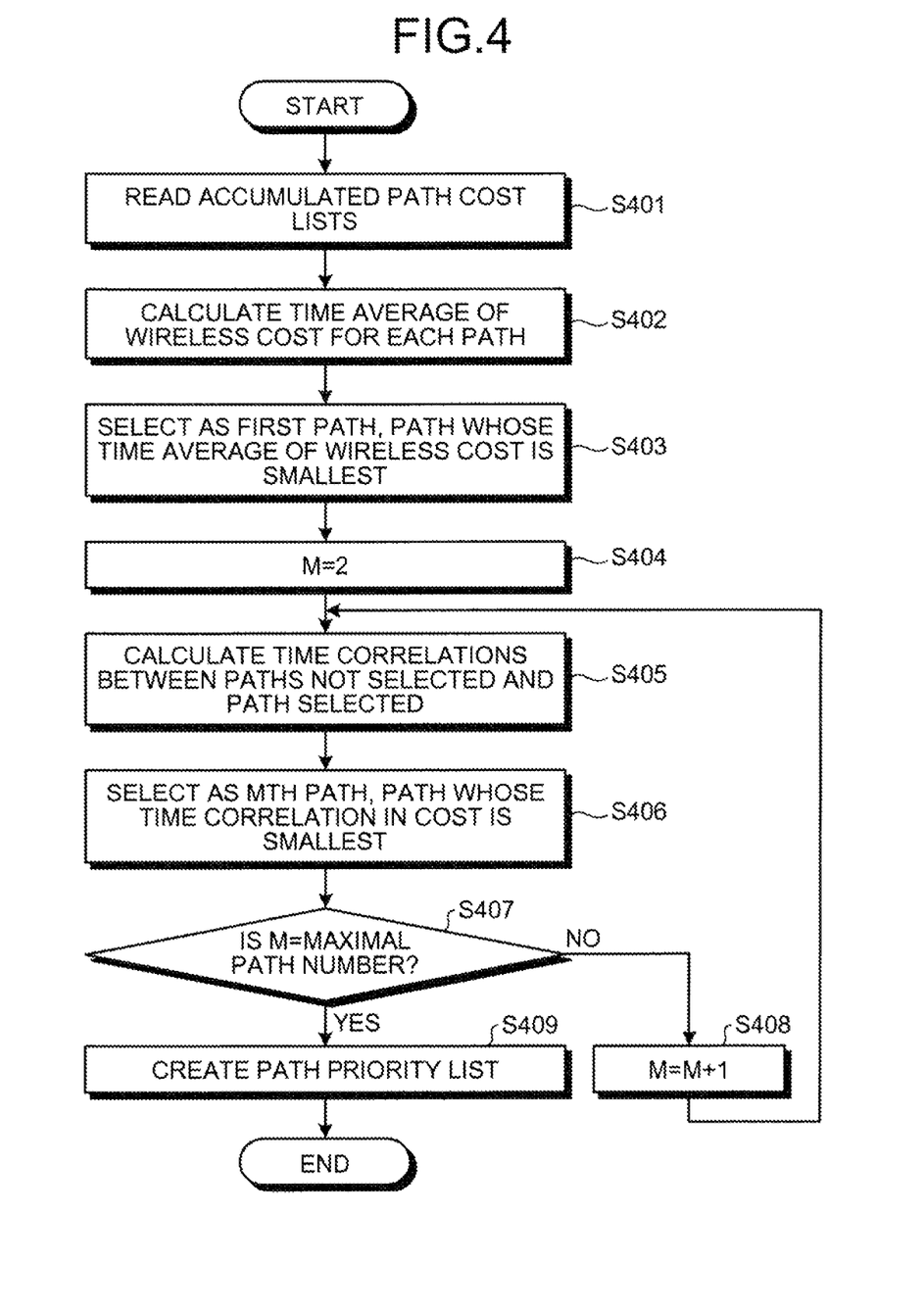
FIG. 4 is a flowchart of an example of operations of determining priority levels by a determining unit.

FIG. 4 is a flowchart of an example of operations of determining priority levels by the determining unit. With reference to FIG. 4, determination of the priority level for each of the paths to the node E will be described. The determining unit 130 first reads the path cost lists that are in the accumulating unit 120 and indicate the wireless cost of the paths (the paths rE1 to rE3) from the node A to the node E (step S401). For example, the determining unit 130 reads the path cost lists 311 to 31n depicted in FIG. 3.

The time average of the wireless cost of each path to the node E is calculated based on the path cost lists read at step S401 (step S402). For example, the determining unit 130 calculates a time average E[COST(rEi, tn)] of the wireless costs of the path rEi according to Equation (1) below. "E[x]" represents an expected value of X.

$$E[COST(rEi, tn)] = E\left[\sum_{j=1}^{N(rEi)} \cos t(rEi, hj, tn)\right] \quad (1)$$

A path having the smallest time average among the time averages in the wireless cost calculated at step S402 for each path, is selected as a path $rEi_1(tn)$ having the first priority (step S403). For example, the determining unit 130 selects the path $rEi_1(tn)$ according to Equation (2) below.

$$rEi_1(tn) = \underset{rEi}{\text{ArgMin}}(E[COST(rEi, tn)]) \quad (2)$$

A path number counter M is initialized (M=2) (step S404). Concerning each path that has not yet been selected among the paths to the node E at step S403 or S406, wireless-cost time correlations with a path that has already been selected are calculated (step S405).

At step S405 in a first loop, a time correlation ρ(COST($rEi_1$, tn), COST(rEi, tn)) in wireless cost between the path rEi having the first priority and a path rEi(tn) may be calculated according to, for example, Equation (3) below, where rEi≠$rEi_1$.

$$\rho(COST(rEi_1, tn), COST(rEi, tn)) = \quad (3)$$

$$\frac{E[(COST(rEi_1, tn))(COST(rEi, tn))]}{\sqrt{E[(COST(rEi_1, tn))^2]E[(COST(rEi, tn))^2]}}$$

The path having the smallest time correlation in wireless cost calculated at step S405 is selected as the path $rEi_M(tn)$ of an M-th priority (step S406). For example, the determining unit 130 selects the path $rEi_M(tn)$ according to Equation (4) below, where rEi≠{$rEi_1$, ..., $rEi_{M-1}$}.

$$rEi_M(tn) = \underset{rEi}{\text{ArgMin}}\left(\sum_{order\#m=1}^{M-1} |\rho(COST(rEi_m, tn), COST(rEi, tn))|\right) \quad (4)$$

Concerning each path that has not yet been selected, time correlations with a path that has already been selected are totaled according to Equation (4) above, and a path having the smallest time-correlation total may be selected. It is determined whether the path number counter M is a predetermined maximal path number (M=the maximal path number) (step S407). If it is determined that the path number counter M is not the maximal path number (step S407: NO), the path number counter M is incremented (M=M+1) (step S408) and the flow returns to step S405.

At step S405 in a second loop, a time correlation ρ(COST($rEi_M$, tn), COST(rEi, tn)) in wireless cost between the path $rEi_M$ having the M-th priority and the path rEi(tn) may be calculated according to, for example, Equation (5) below, where rEi≠{$rEi_1$, ..., $rEi_M$}.

$$\rho(COST(rEi_M, tn), COST(rEi, tn)) = \quad (5)$$

$$\frac{E[(COST(rEi_M, tn))(COST(rEi, tn))]}{\sqrt{E[(COST(rEi_M, tn))^2]E[(COST(rEi, tn))^2]}}$$

If it is determined at step S407 that the path number counter M is the maximal path number (step S407: YES), a path priority list is created (step S409) and a series of operations comes to an end. The path priority list created at step S409 is a list that indicates the paths $rEi_1(tn)$ to $rEi_M(tn)$, which are selected at steps S403 and S406. By executing these operations, the determining unit 130 determines the priority level of each of the paths, based on the time correlations between the paths in terms of the respective wireless cost of each path.

More specifically, at step S406, a path that is among the paths whose priority level has not been determined and that has the smallest time correlation in wireless cost with the paths whose priority level, may be determined to have the highest priority level next to the priority levels that have already been determined. Thereby, a path having a smaller time correlation in wireless cost with other paths is given a higher priority level. Therefore, the probability of simultaneous degradation of the wireless cost for the paths whose probability of being used is high can be reduced, and tolerance to variations in the state of the network may be improved further.

At step S403, the time average of the wireless cost is calculated for each path, and a path having the smallest time average may be determined to have the highest priority level. Thus, by giving the highest priority level to a path that is the most stable and that has a low wireless cost and by executing communication using this path, communication quality can be improved.

At step S403, the determining unit 130 may determine a path whose wireless cost is lowest and acquired last by the acquiring unit 110, to have the highest priority level. Thereby, the path whose wireless cost is currently lowest is preferentially used for communication, improving communication quality.

The determining unit 130 executes the operations above, for example, each time the acquiring unit 110 acquires the wireless cost for a path, enabling creation of a path priority list that reflects the latest temporal variation of the wireless cost of each path, improving tolerance to variations in the state of the network. Although priority level determination has been described for each of the paths to the node E, the determining unit 130 may similarly execute priority level determination for each of the paths to nodes B to D and F to I.

Figure 5:
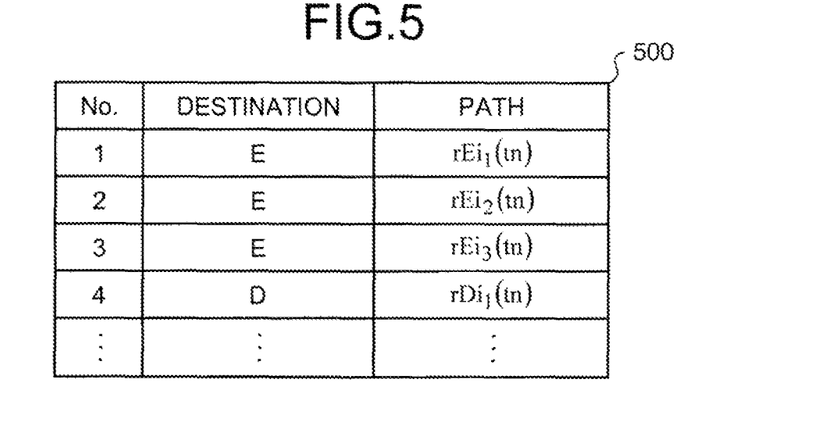
FIG. 5 is a diagram of an example of a path priority list that is created by the priority level determining operations depicted in FIG. 4.

FIG. 5 is a diagram of an example of a path priority list that is created by the priority level determining operations depicted in FIG. 4. A path priority list 500 represents an example of the path priority list that is created at step S409 of the priority level determining operations depicted in FIG. 4. In the path priority list 500, the paths are listed in descending order of priority level by destination.

The communicating unit 140 communicates with other communication apparatuses by preferentially using a path of a relatively high priority level as indicated in the path priority list 500. For example, when the communicating unit 140 communicates with the node E, among the paths $rEi_1(tn)$, $rEi_2(tn)$, and $rEi_3(tn)$ to the node E in the path priority list 500, the communicating unit 140 preferentially uses paths having higher priority levels in the path priority list 500.

For example, the communicating unit 140 communicates with the node E using the path $rEi_1(tn)$ having the highest priority level and when a communication error occurs, switches the path to the path $rEi_2(tn)$ having the second highest priority level to continue the communication. Thereby, the time correlation in wireless cost is reduced after the switching of the path relative to that before the switching, enabling switching to a path having a different trend of variation in wireless cost. Thus, the possibility of improving the wireless cost by a switching of paths is increased.

Alternatively, the communicating unit 140 communicates with the node E by simultaneously using the path $rEi_1(tn)$ having the highest priority level and the path $rEi_2(tn)$ having the second highest priority level. Thereby, the time correlation in wireless cost between the paths that are simultaneously used is reduced and therefore, the possibility of simultaneous degradation of the wireless cost of the paths that are simultaneously used is reduced even when the state of the network varies.

Figure 6:
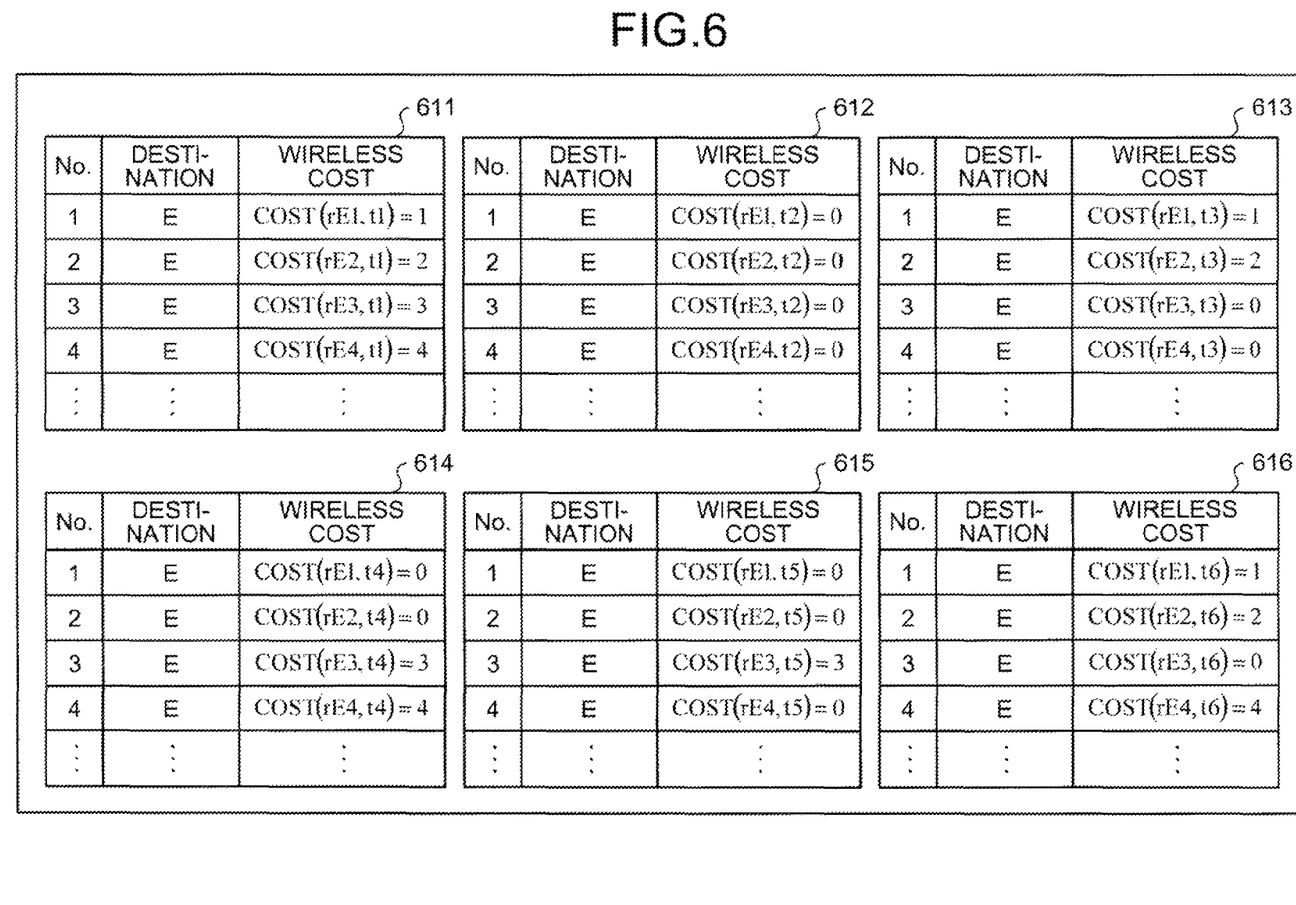
FIG. 6 is a diagram of an example of path cost lists in the accumulating unit.

FIG. 6 is a diagram of an example of path cost lists in the accumulating unit. Determination of the priority level of each of the paths to the node E will be described with reference to FIG. 6. It is assumed that the maximal path number is three at step S407 of FIG. 4.

It is assumed that the path cost lists 611 to 616 depicted in FIG. 6 are read at step S401 of FIG. 4. The path cost lists 611 to 616 are path cost lists acquired by the acquiring unit 110 at times t1 to t6, respectively. By applying this example to Equation (1) above at step S402 of FIG. 4, a time averages $E[COST(rE1, tn)]$ to $E[COST(rE4, tn)]$ of the wireless costs of the paths rE1 to rE4 are calculated as expressed in Equations (6) to (9) below.

$$E[COST(rE1, tn)] = \frac{1}{6}(1 + 0 + 1 + 0 + 0 + 1) = 0.5 \quad (6)$$

$$E[COST(rE2, tn)] = \frac{1}{6}(2 + 0 + 2 + 0 + 0 + 2) = 0.8 \quad (7)$$

$$E[COST(rE3, tn)] = \frac{1}{6}(3 + 0 + 0 + 3 + 3 + 0) = 1.5 \quad (8)$$

$$E[COST(rE4, tn)] = \frac{1}{6}(4 + 0 + 0 + 4 + 0 + 4) = 2 \quad (9)$$

By applying the results of Equations (6) to (9) above to Equation (2) at step S403 of FIG. 4, the path rE1 is selected as the path $rEi_1(tn)$ having the first priority as expressed in Equation (10) below.

$$rEi_1(tn) = \underset{rEi}{\mathrm{ArgMin}}(E[COST(rEi, tn)]) = rE1 \quad (10)$$

By applying the result of Equation (10) above to Equation (3) at step S405 of FIG. 4, time correlations in wireless cost between the paths rE2 to rE4 and the path $rEi_1$ are calculated. The time correlations $\rho(COST(rE1_1, tn), (COST(rE2, tn))$ to $\rho(COST(rE1_1, tn), (COST(rE4, tn))$ in wireless cost between the paths rE2 to rE4 and the path $rEi_1$ are expressed in Equations (11) to (13) below.

$$\rho(COST(rE1_1, tn)COST(rE2, tn)) = \frac{E[(COST(rE1_1, tn))(COST(rE2, tn))]}{\sqrt{E[(COST(rE1_1, tn))^2]E[(COST(rE2, tn))^2]}} = \frac{\frac{1}{6}(1 \times 2 + 0 \times 0 + 1 \times 2 + 0 \times 0 + 0 \times 0 + 1 \times 1)}{\sqrt{\frac{1}{6}(1^2 + 0^2 + 1^2 + 0^2 + 0^2 + 1^2) \times \frac{1}{6}(2^2 + 0^2 + 2^2 + 0^2 + 0^2 + 1^2)}} = 0.8 \quad (11)$$

$$\rho(COST(rE1_1, tn), COST(rE3, tn)) = \frac{E[(COST(rE1_1, tn))(COST(rE3, tn))]}{\sqrt{E[(COST(rE1_1, tn))^2]E[(COST(rE3, tn))^2]}} = \frac{\frac{1}{6}(1 \times 3 + 0 \times 0 + 1 \times 0 + 0 \times 3 + 0 \times 3 + 1 \times 0)}{\sqrt{\frac{1}{6}(1^2 + 0^2 + 1^2 + 0^2 + 0^2 + 1^2) \times \frac{1}{6}(3^2 + 0^2 + 0^2 + 3^2 + 3^2 + 0^2)}} = 0.333 \quad (12)$$

$$\rho(COST(rE1_1, tn), COST(rE4, tn)) = \frac{E[(COST(rE1_1, tn))(COST(rE4, tn))]}{\sqrt{E[(COST(rE1_1, tn))^2]E[(COST(rE4, tn))^2]}} = \frac{\frac{1}{6}(1 \times 4 + 0 \times 0 + 1 \times 0 + 0 \times 4 + 0 \times 0 + 1 \times 4)}{\sqrt{\frac{1}{6}(1^2 + 0^2 + 1^2 + 0^2 + 0^2 + 1^2) \times \frac{1}{6}(4^2 + 0^2 + 0^2 + 4^2 + 0^2 + 4^2)}} = 0.666 \quad (13)$$

By applying the results of Equations (11) to (13) above to Equation (4) at step S406 of FIG. 4, the path rE3 is selected as the path $rEi_2(tn)$ having the second highest priority as expressed in Equation (14) below.

$$rEi_2(tn) = \underset{rEi}{\mathrm{ArgMin}}\left(\sum_{order\#m=1}^{2-1} |\rho(COST(rEi_m, tn), COST(rEi, tn))|\right) = rE3$$

(14)

By applying the result of Equation (14) to Equation (3) at step S405 in the second loop of FIG. 4, time correlations in wireless cost of the paths rE2 and rE4 with the path $rE3_2$ are calculated. The time correlation $\rho(COST(rE3_2, tn), COST(rE2, tn))$ in the wireless cost of the path rE2 with the path $rE3_2$ is expressed in Equation (15) below. The time correlation $\rho(COST(rE3_2, tn), COST(rE4, tn))$ in wireless cost of the path rE4 with the path $rE3_2$ is expressed in Equation (16) below.

$$\rho(COST(rE3_2, tn), COST(rE2, tn)) = \frac{E[(COST(rE3_2, tn))(COST(rE2, tn))]}{\sqrt{E[(COST(rE3_2, tn))^2]E[(COST(rE2, tn))^2]}} = \quad (15)$$

$$\frac{\frac{1}{6}(3 \times 2 + 0 \times 0 + 0 \times 2 + 3 \times 0 + 3 \times 0 + 0 \times 1)}{\sqrt{\frac{1}{6}(3^2 + 0^2 + 0^2 + 3^2 + 3^2 + 0^2) \times \frac{1}{6}(2^2 + 0^2 + 2^2 + 0^2 + 0^2 + 1^2)}} = 0.3849$$

$$\rho(COST(rE3_2, tn), COST(rE4, tn)) = \frac{E[(COST(rE3_2, tn))(COST(rE4, tn))]}{\sqrt{E[(COST(rE3_2, tn))^2]E[(COST(rE4, tn))^2]}} = \quad (16)$$

$$\frac{\frac{1}{6}(3 \times 4 + 0 \times 0 + 0 \times 0 + 3 \times 4 + 3 \times 0 + 0 \times 4)}{\sqrt{\frac{1}{6}(3^2 + 0^2 + 0^2 + 3^2 + 3^2 + 0^2) \times \frac{1}{6}(4^2 + 0^2 + 0^2 + 4^2 + 0^2 + 4^2)}} = 0.666$$

By applying the results of Equations (15) and (16) to Equation (4) at step S406 in the second loop of FIG. 4, the path rE4 is selected as the path $rEi_3(tn)$ having the third highest priority level as expressed in Equation (17) below.

$$rEi_3(tn) = \quad (17)$$

$$\underset{rEi}{\mathrm{ArgMin}} \left( \sum_{order\#m=1}^{3-1} |\rho(COST(rEi_m, tn), COST(rEi, tn))| \right) = rE4$$

In this case, the path number counter M becomes the maximal path number, which is three and therefore, the path priority list is created at step S409 of FIG. 4. The path rE2 that is not selected at steps S403 and S406 is not included in the path priority list created.

Figure 7:
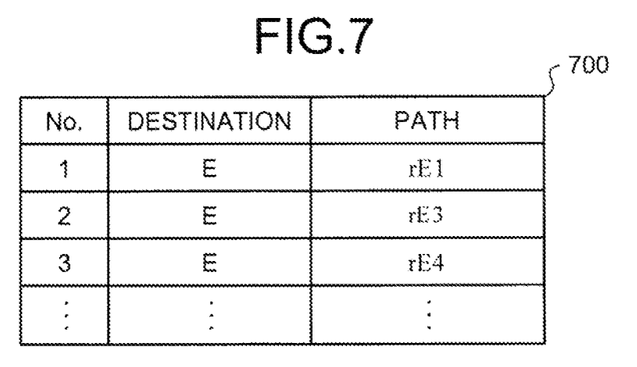
FIG. 7 is a diagram of an example of a path priority list that is created in the example depicted in FIG. 6.

FIG. 7 is a diagram of an example of a path priority list that is created in the example depicted in FIG. 6. A path priority list 700 depicted in FIG. 7 represents an example of a path priority list that is created in the example depicted in FIG. 6. In the path priority list 700, the paths are listed in descending order of priority level by destination. For example, the path priority list 700 indicates that the priority level of each of the paths rE1, rE3, and rE4 to the node E descends in this order.

For reference, an example where a path is determined based on the latest path cost list as the conventional technique does will be described. Assuming that the traveling speed of each node is 3 [km/h], path searches need to be executed at a frequency of n=1/Tc=16πfd/9=54.3 [times/sec] or higher to determine a path that is stable and keeps up with the speed of variation of the state of the network. In this case, "Tc" is the coherent time and "fd" is the Doppler frequency.

In contrast, the communication apparatus 100 accumulates the past wireless costs for each path and determines a priority level for each path, based on the time correlation in wireless cost among the paths. Thereby, the probability of simultaneous degradation of the wireless cost of paths having successive priority levels may be decreased, and tolerance to variations in the state of the network may be improved. Therefore, the communication apparatus 100 executes no path search keeping up with the speed of variation in the state of the network and merely executes path searches, for example, at intervals at which the electric field intensity for reception varies due to the movement of a node.

For example, assuming that the electric field intensity variation of 3 [db]=1.36 [m], the carrier frequency fc is fc=2.5 [GHz], and the time period of moving at 3 [km/h] of each node=1.64 [sec], it is assumed that the interval "n" of the path search by the communication apparatus 100 is n=1/Tm=0.6 [times/sec]. Therefore, the frequency of the path searches may be reduced to about 1/90 thereof.

As described, according to the communication apparatus 100 of the embodiment, the past wireless costs are accumulated for each path and the priority level of each path is determined based on time correlations in wireless cost, among the paths. Thereby, tolerance to variations in the state of a network may be improved.

Therefore, according to the communication apparatus 100, a stable path diversity gain may be realized in an ad hoc network whose network state varies continuously. According to the communication apparatus 100, the tolerance to variations in the state of a network may be improved even if the frequency of path searches is not increased and therefore, the wireless resources are not pressured.

Although an example where the communication apparatus 100 is applied to the node A has been described, the communication apparatus 100 may be applied to each of the nodes A to I of the communication system 200. Tolerance to variations in the state of the communication network in the communication system 200 is improved by applying the communication apparatus 100 to each of the nodes of the communication system 200. Further, since the wireless resources are not pressured, the throughput of the communication system 200 is improved.

The method is not limited to the method herein, of creating a path priority list for the paths whose trends of variation in wireless cost are different from each other and have successive priority levels. For example, among the paths whose priority level has not yet been determined, the determining unit 130 determines a path having the greatest physical distance from paths whose priority level has already been determined, to have the highest priority level next to the priority level that has already been determined. A physical distance between paths is calculated by acquiring the positions of the nodes A to I using, for example, a Global Positioning System (GPS).

As described, according to the embodiments disclosed herein, tolerance to variations in the state of a network is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus comprising:
   an acquiring unit that acquires wireless cost for each path to other communication apparatuses in an ad hoc network to which the communication apparatus belongs;
   an accumulating unit that accumulates wireless cost for each path, acquired at different times by the acquiring unit;
   a determining unit that determines a priority level for each path, based on time correlations among the paths in terms of the wireless cost accumulated by the accumulating unit; and
   a communicating unit that communicates with the other communication apparatuses by using a path according to descending order of priority level;
   wherein the determining unit provides a path that has not been given a priority level and has the lowest time correlation with a path whose priority level has been determined with the highest priority level next to the priority level that has been determined.

2. The communication apparatus according to claim 1, wherein
   the determining unit calculates a time average of the wireless cost for each path and determines a path whose calculated time average is smallest to have a priority level that is highest.

3. The communication apparatus according to claim 1, wherein
   the determining unit determines a path whose wireless cost is lowest and acquired last by the acquiring unit to have a priority level that is highest.

4. The communication apparatus according to claim 1, wherein
   the determining unit determines a priority level for each path, each time the wireless cost for each path is acquired by the acquiring unit.

5. A communication method comprising:
   acquiring wireless cost for each path to other communication apparatuses in an ad hoc network to which a given communication apparatus belongs;
   accumulating wireless cost for each path, acquired at different times at the acquiring;
   determining a priority level for each path, based on time correlations among the paths in terms of the wireless cost accumulated at the accumulating; and
   communicating with the other communication apparatuses by using a path according to descending order of priority level;
   wherein the determining provides a path that has not been given a priority level and has the lowest time correlation with a path whose priority level has been determined with the highest priority level next to the priority level that has been determined.

* * * * *